United States Patent [19]

Gysel et al.

[11] Patent Number: 5,649,010
[45] Date of Patent: Jul. 15, 1997

[54] SEND FILTER FOR AN ECHO CANCELER

[75] Inventors: Peter Gysel, Zurich; Bruno Wenger, Au/zh; August Kaelin, Bonstetten; Daniel Mueller, Zurich, all of Switzerland

[73] Assignee: Siemens Schweiz AG, Zurich, Switzerland

[21] Appl. No.: 504,110

[22] Filed: Jul. 19, 1995

[30] Foreign Application Priority Data

Jul. 20, 1994 [CH] Switzerland .................. 02 298/94

[51] Int. Cl.$^6$ .................................................. H04M 9/00
[52] U.S. Cl. .................... 379/406; 379/407; 379/410; 379/411
[58] Field of Search .................... 379/406, 407, 379/408, 410, 411, 402

[56] References Cited

U.S. PATENT DOCUMENTS

| 4,600,815 | 7/1986 | Horna | 379/390 |
|---|---|---|---|
| 5,084,865 | 1/1992 | Koike | 379/406 |

FOREIGN PATENT DOCUMENTS

| 0229524 | 7/1987 | European Pat. Off. . |
| 0384490 | 8/1990 | European Pat. Off. . |
| 0464500 | 1/1992 | European Pat. Off. . |
| 4138567 | 6/1992 | Germany . |
| 02171946 | 7/1994 | Switzerland . |
| 2253771 | 9/1992 | United Kingdom . |

OTHER PUBLICATIONS

Article by J.W. Lechleider, entitled "High Bit Rate Digital Subscriber Lines": A Review of HDSL Progress published in the IEEE Journal on Sel. Areas in Com., 9(6); pp. 769–784, Aug. 1991.

Article by R. Batruni et al., entitled "Mixed Digital/Analog Signal–Processing for a Single–Chip 2BIQ U–Interface Transceiver" (IEEE Journal of Solid–State Circuits, vol. 25, No. 6, published Dec. 1990, pp. 1414 to 1425.

Article by A. Kaelin et al., entitled "Linear Echo Cancellation Using Optimized Recursive Prefiltering", Proc. IEEE Int. Symp. on Circuits and Systems, Chicago, pp. 463 to 466, 1993.

Article by N. Holte and S. Stueflotten, entitled "A new digital echo canceler for two–wire subscriber lines" published in IEEE Trans. on Communicatons, 29(11), pp. 1573 to 1581, Nov. 1981.

International Search Report regarding parent Swiss Application CH 2298/94.

Article in the IEEE Journal of Solid–State Circuits, vol. 23, No. 2, Apr. 1988, NY, USA, pp. 311–317, by Roessler et al., entitled "CMOS Analog Front End of a Transceiver with Digital Echo Cancellation for ISDN".

(List continued on next page.)

Primary Examiner—Krista M. Zele
Assistant Examiner—Jacques M. Saint-Surin
Attorney, Agent, or Firm—Greenblum & Bernstein, P.L.C.

[57] ABSTRACT

Send filter for an echo canceler. A circuit includes a send path carrying a send signal, a receiver path carrying a received signal, an adaptive filter, a compensator contained in the received path, a digital/analog converter, a transmission unit, and a transmission line attached to the transmission unit, wherein over the transmission line, at least the send signal, the received signal, the echo signal portions are transmitted, and the send and received path are additionally connected with the transmission unit and the send signal is transmitted to the adaptive filter for the estimation of the echo signal which is processed in the compensator for the production of the receiving signal, with the send signal being conveyed, on the send path, to digital/analog converter, which, with the symbol rate of the send signal, produces square pulses, which in turn are transformed, in the send filter, connected with the digital/analog converter, into pulse forms useable for transmission via the transmission line, with the send filter being so conceived that the digital/analog converter merely has a resolution of two bits, whereby non-identities, particularly non-linearities, are compensated with the aid of the adaptive filter, the latter including at least one FIR filter portion of the storage compensation type.

6 Claims, 6 Drawing Sheets

OTHER PUBLICATIONS

Article in the International Journal of Electronics, vol. 56, No. 2, Feb. 1984, London GB, pp. 211–216, by Cheung, entitled "A wave shaping method for NRZ pulses".

"Nonlinear Echo Cancellers Based on Transpose Distributed Arithmetic" by M.J. Smith, C.F.N. Cowan and P.F. Adams, IEEE transactions on Circuits and Systems, vol. 35, No. 1, Jan. 1988.

"A Hybrid HDSL Echo Canceler" by D. Mueller and A. Kaelin, published at the Proc. IEEE Int. Symp. on Circuits and Systems, Seattle, WA, Mar. 1995.

"A Hybrid HDSL Echo Canceler" by D. Mueller and A. Kaelin, published at the Proc. IEEE Int. Symposium on Circuits and Systems, Seattle WA, Mar. 1995, Mar. 1995.

SEND FILTER FOR AN ECHO CANCELER

CROSS REFERENCE TO RELATED APPLICATIONS

This application claims the priority of Swiss Application No. 02 298/94-8, filed Jul. 20, 1994; and Swiss Application No. 01 996/95-1, filed Jul. 10, 1995, the disclosures of which are incorporated herein by reference in their entireties.

BACKGROUND OF THE INVENTION

1. Field of the Invention

The present invention pertains to a circuit arrangement comprised of a send path carrying a send signal; a receiving path carrying a received signal;, an adaptive filter; a compensator in the received path; a digital/analog converter; a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter and wherein the estimated digital echo signal is transmitted to the compensator for the reduction of the echo signal portion in the received path.

2. Discussion of the Background of the Invention and Material Information

Copper lines or wiring continue to serve as the main transmission medium of the transfer of data between a subscriber connection and a communications office of a public communication network. A subscriber connection must, on one side, be economically advantageous for the subscriber, yet on the other hand, it is desirable to realize the highest possible data transmission rate. Via the replacement of copper wire with glass fiber cables, the noted second condition could be largely fulfilled, however, this would be coupled with substantially increased costs, since the existing detailed distribution net would have to be completely replaced. For this very reason, the development of a fast digital fully duplex data transmission line, via copper wires, has already been suggested repeatedly. An overview of this suggested data transmission denoted as HDSL (High Bit Rate Digital Subscriber Line) was, for example, published in an article by J. W. Lechleider, entitled "High Bit Rate Digital Subscriber Lines: A Review of HDSL Progress" published in the IEEE Journal on Sel. Area in Com., 9(6), Pages 769 to 784, August 1991.

With HDSL data transmission, data is still transmitted in both directions via a copper cable. This so-called transmission unit, also denominated as terminating unit, controls the directional separation of the signals to be sent and to be received. Since this directional separation, particularly due to the changing characteristics of the lines, cannot be perfectly realized, the signal received, by a distant subscriber, is superimposed with a echo signal (also denominated as error signal) of the nearby subscriber. The echo signal can be about 30 to 40 dB stronger than the actual useful signal. In order to achieve, at the receiver, the required bit error rate of about $10^{-7}$ an adaptive compensation of the echo is undertaken, in that, via the use of an adaptive filter, the echo signal is estimated and subtracted from the received signal. For such an adaptive filter, for example, FIR (Finite Impulse Response) filters are utilized, which can have 90 to 100 coefficients (Taps) and as result thereof require a correspondingly large basic circuit block. In order to reduce the circuit expenditure, European Patent Application EP-0 384 490 discloses an echo canceler with an adaptive filter that is comprised of FIR (Finite Impulse Response) and an IIR (Infinite Impulse Response) filter, in a tandem or cascade connection. Therewith, a reduction of the circuit expenditure for the adaptive filter is achieved, however with this adaptive filter non-linearities in the send path cannot be compensated.

In addition, European Patent Application EP-0 464 500 discloses an echo canceler in which the send path, in addition to the amplifier elements, includes at least one delay element, a digital/analog converter and a analog low-pass filter, wherein particularly the digital/analog converter, due to the required high resolution and the simultaneously required high linearity, can only be implemented with a correspondingly great expenditure.

Furthermore, in an article authored by R. Batruni et al. and entitled "Mixed Digital/Analog Signal-Processing for a Single-Chip 2B1Q U- Interface Transceiver" (IEEE Journal of Solid-State Circuits, Vol 25, No. 6, published December 1990, pages 1414 to 1425), an echo path is described which is comprised of a digital prefilter, a digital/analog converter and an analog smoothing filter. Therein, with the aid of the prefilter, the send signal is so preformed, that after its transformation into an analog send signal, with the aid of the digital/analog converter, it must only yet be filtered with an analog smoothing filter having low-pass filter characteristics. While an approximately optimum analog send signal is obtained via this circuit arrangement, such a digital prefilter and the necessary higher linear digital/analog converter, require relatively great circuit expenditures.

The present invention thus has the task or object to produce a circuit arrangement for the production of an analog send signal wherein the circuit expenditures are significantly reduced.

SUMMARY OF THE INVENTION

This task or object is achieved in the features set forth in the appended claims. Specifically, one embodiment of this invention pertains to a circuit arrangement comprised of a send path carrying a send signal; a receiving path carrying a received signal;, an adaptive filter; a compensator in the received path; a digital/analog converter; a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter and wherein the estimated digital echo signal is transmitted to the compensator for the reduction of the echo signal portion in the received path, with the send signal being impressed upon the digital/analog converter and a send filter being interposed in the send path, between the digital/analog converter and the transmission unit.

In a further embodiment of the circuit arrangement of this invention, the send filter is so constructed that, from a square pulse, existing at an inlet of the send filter, a predetermined pulse form is produced at an outlet of the send filter.

In another embodiment of the circuit arrangement of this invention the adaptive filter is comprised of at least an FIR (Finite Impulse Response) filter portion, with the FIR filter portion being of the storage compensation type.

In a differing embodiment of the circuit arrangement of this invention the adaptive filter is additionally comprised of an IIR (Infinite Impulse Response) filter portion.

In still a further embodiment of the circuit arrangement of this invention the FIR filter portion (FIR) at least one storage element and at least one digit delay element are provided, and when several digit delay elements are provided the several digit delay elements are switched in series with the first digit delay element being impressed with the send signal, and wherein the send signal and the send signals delayed via the digit delay elements, are each impressed on at least one storage element, from each of which one value of one addressed storage cell in the storage element can be read and accumulated in an adder.

In still another embodiment of the circuit arrangement of this invention the send signal is tetravalent and the digital/ analog converter has a resolution of two bits, whereby the FIR filter portion is so adaptively adjusted that non-idealities of the digital/analog converter are corrected.

In still a differing embodiment of the circuit arrangement of this invention the send signal is 2B1Q encoded.

In yet a further embodiment of the circuit arrangement of this invention the characteristic pole positions, corresponding to the transmission characteristics of the transmission line, are fixed, for the IIR filter portion.

In yet another embodiment of the circuit arrangement of this invention the send filter has a transfer function $T(s)= T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}$$

In yet a differing embodiment of the circuit arrangement of this invention the conversion rate of the digital/analog converter is no greater than the symbol rate of the send signal.

In that the send filter converts the analog square pulses, produced in the digital/analog converter into pulses suitable for the direct transmission via the transmission line, a digital preprocessing of the send signal ahead of the digital/analog transformation can be eliminated. While the expenditure for the analog send filter are greater than one for an analog smoothing filter, however, this additional expense is more than compensated via the feasibility for using a substantially simpler digital/analog converter. In particular, the resolution and speed of the digital/analog converter can be substantially reduced.

In a further variation, for at least a portion of the adaptive filter an FIR filter, based upon the storage compensation principle, is utilized. This special adaptive FIR filter permits the reduction of the linearity requirements of the digital/ analog convertor since non-linearities of the digital/analog converter can be compensated. This in turn permits a further reduction of the circuit expenditure.

With the realization or during the implementation of the circuit arrangement via the chip integration (as a so-called integrated circuit) a reduction of the circuit expenditure is of significance not only in terms of space but also particularly with the coupled and reduced energy usage since such usage, with the same technology also increases with increasing size of the switching arrangement. The particular significance of this last-noted advantage results from the fact that the energy, available to the subscriber, is limited via the now-existing energy production facilities. Additional sources of energy are not contemplated.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
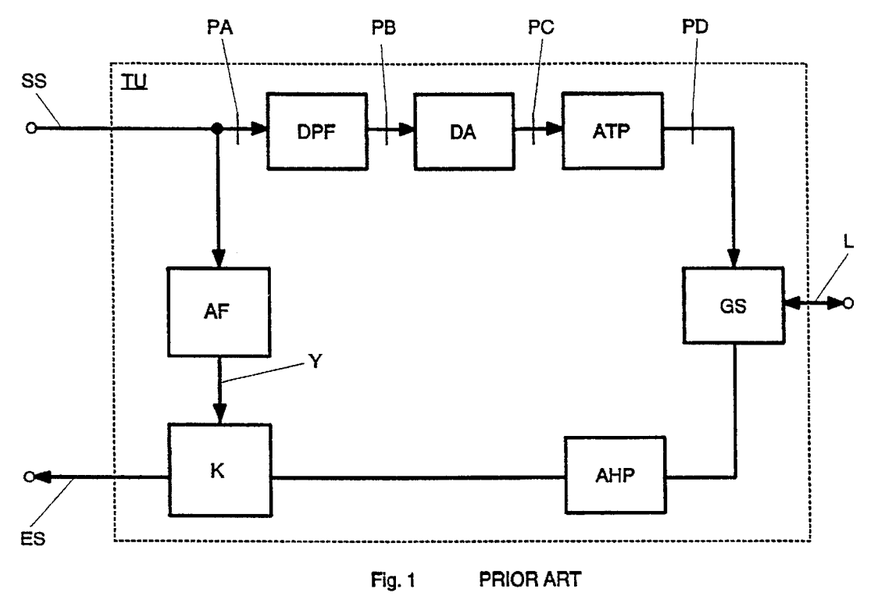
FIG. 1 shows a transmission network with a known echo canceler having a digital prefilter in the send path thereof.

FIG. 1 shows a know transmission network TU for the separation of analog information transmitted over a transmission line L, in both directions, into a digital send signal SS and a digital received signal ES. The transmission network TU includes essentially a send path for the send signal SS, comprising a digital prefilter DPF, a digital/analog converter DA and an analog smoothing filter ATP, as well as a received path carrying a received signal ES, comprised of an analog high-pass filter AHP and a compensator K, wherein the analog smoothing filter ATP, for transmitting the analog send signal and the analog high-pass filter AHP, for receiving the analog received signal, are connected with a transmitting unit GS. In addition, send signal SS is impressed upon adaptive filter AF as well as digital prefilter DPF, with the output signal of prefilter DPF being conveyed to digital/analog converter DA. In addition digital/analog converter DA is connected with analog smoothing filter ATP.

During the implementation of transmission unit GS, as the result of non-idealities, at least a portion of send signals SS is directing transferred into the received path. In addition, an unacceptable echo of send signal SS, produced at remote locations of transmission line L, enters the received path. Therewith, the actual received signal is superimposed with an error signal comprised of both of the previously noted components. Hereinafter, this error signal is generally designated as "echo signal." In order to achieve the desired bit error rate, noted in the introduction, for this reason an adaptive filter AF is utilized, via which a echo signal Y is estimated and subsequently utilized for the restoration of the actually received signal ES. For this reason, the compensator K is switched after analog high-pass filter AHP, in the received path, in which the estimated echo signal Y is subtracted from the received signal. Therefore, at the outlet or output of the transmission network TU the approximate received signal is available for use.

Compensation K can be implemented in different ways. A particularly useful implementation is set forth in copending Swiss Patent Application No. 02171/94-6, which is also assigned to the assignee of this invention with the disclosure of this copending application being incorporated herein by reference in its entirety.

Since the echo signal also changes due to changes in the line characteristics, the coefficients of filter AF must constantly be adapted to the new requirements. This can be accomplished, for example via the known LMS (Least Man Square) Algorithms or the LMS-variation, with the aid of which the coefficients of filter AF are adapted. Reference can be made to the books by B. Widrow and S. D. Stearns, "Adaptive Signal Processing", published by Prentice-Hall, Inc., Englewood Cliffs, N.J., 1985; and C. Cowan and P. Grant, "Adaptive Filter", similarly published by Prentice-Hall, in 1985.

FIG. 2 shows the signal variations in different signal points PA, PB, PC and PD (FIG. 1) of the send path of know transmission network TU. Thus, signal point PA is located before digital prefilter DPF, signal point PB is located between digital/analog converter DA and digital prefilter DPF, signal point PC is located between analog smoothing filter ATP and digital/analog converter DA, with signal point PD finally being located between transmission unit GS and analog smoothing filter ATP.

Figure 2A:
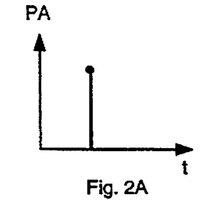
FIGS. 2a, 2b, 2c and 2d show differing signal variations in the send path of the known echo canceler.
Figure 2B:
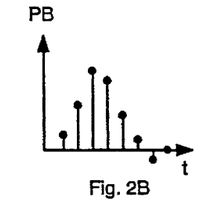
Figure 2C:
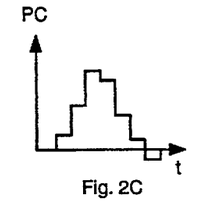
Figure 2D:
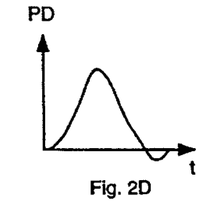

The signal variation shown in FIG. 2A corresponds to the one in signal point PA and as well as send signal SS, wherein for the following explanation, in the interest of simplicity, a single pulse is illustrated, whose height corresponds to one of the possible symbol values. Such pulses follow one another in the symbol rate of send signal SS. The former shape of the pulses that reach transmission line L, must be brought to pulse forms that lie within the prescribed tolerance ranges prescribed by international standards organizations, or that are at least useable for transmission over transmission line L. Thus, for example, the ETSI (European Telecommunications Standards Institute) prescribes a pulse or its tolerance region in a time region wherein, at the same time, requirements in the frequency region, with respect to the power densities, must be met. In order to fulfill these requirements, the digital prefilter DPF (FIG. 1) is used in a known manner, which changes the pulse, shown in FIG. 1, into the pulse repetition, with substantially higher clock rates, shown in FIG. 2b. Via this new pulse repetition, the analog send signal is, although but discretely, preformed at this location. Viewed in the direction of the signal, following the digital/analog converter DA (FIG. 1) whose conversion rate of the clock frequency corresponds to the digitally prefiltered input signals, the analog signal, shown in FIG. 2c, is produced in converter DA at signal point PC (FIG. 1), which signal is finally brought into the desired analog form, by analog smoothing filter ATP, as required by the standards. The smoothing filter ATP generally takes the form of a standard issue low-pass filter, particularly a Bessel or Butterworth filter, typically of the second to fifth order.

A notable disadvantage of such a built up send or emitting path is due to the requirements of the digital/analog convertor DA. Converter DA must initially have a conversion rate that is a multiple of the symbol rate. In addition, increased requirement are also necessary relative to the resolution and linearity of the digital/analog converter DA in order that the desired analog send signal is produced as accurately as possible and that therewith, in the different pulses to be sent, no non-linear distortions can occur.

Figure 3:
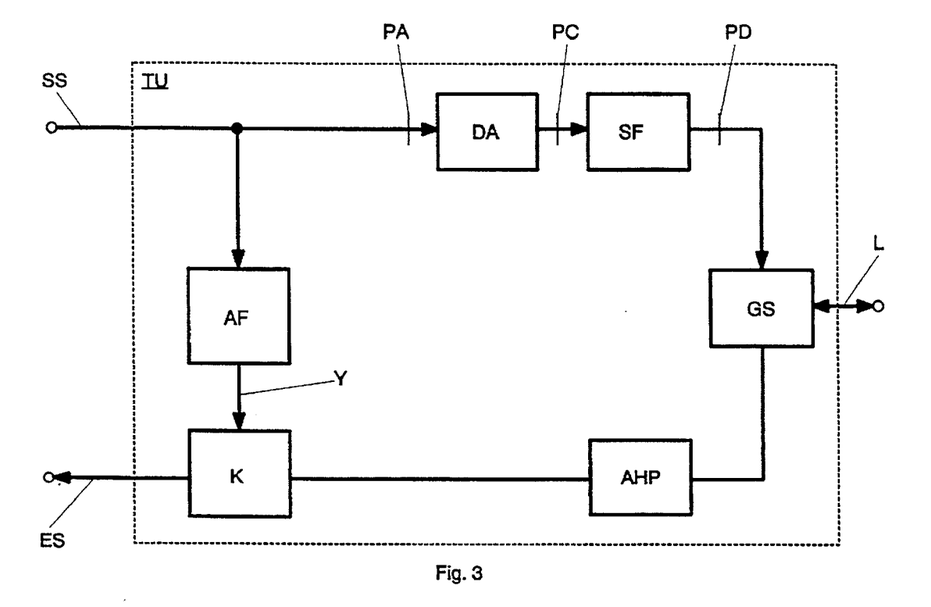
FIG. 3 shows the transmission network with the echo canceler of this invention having an analog send filter in the send path.
Figures 4, 4A, 4B, 4C:
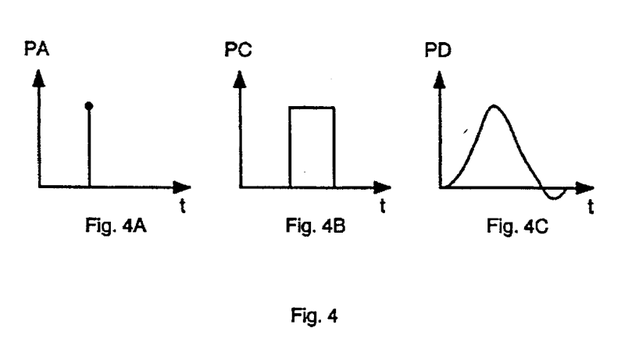
FIGS. 4a, 4b and 4c show differing signal variation in the send path of the echo canceler of this invention.

FIG. 3 shows the constructional principle of the inventive transmission network TU, which essentially corresponds with the transmission network illustrated in FIG. 4, wherein, however, the send path of the inventive transmission network TU now is only comprised of a digital/analog converter DA and a send filter SF. The send signal SS, opposite to the transmission network TU of FIG. 1, as a result thereof directly impresses upon digital/analog converter DA, whose output signal is connected with send filter SF. Finally, send filter SF is connected with transmission unit GS. Between the send and received path, again an adaptive filter AF and a compensator K are provided, wherein in compensator K, for the production of the actual received signal, an estimated echo signal Y that is estimated in adaptive filter AF, is subtracted from the signal in the received path.

In order to maintain simplicity, in FIG. 3, as is the case already in FIG. 1, the usually occurring amplification multipliers, adders, low-pass and high-pass filters, etc., are not shown. Such additional signal processing units are noted in the following description only when it is absolutely necessary for the understanding of the function of the circuit arrangement.

In the following working example or embodiment it is presumed that send signal SS is available as a tetravalent signal that is produced via the transformation of a binary data stream, for example, with the aid of a 2B1Q encoder, not shown in FIG. 3. Therein, the 2B1Q encoder always transforms or converts two bits of the binary data stream into a tetravalent symbol, wherein the following data scheme is utilized: the binary sequence "00" changes to −3, "01" to −1, "11" to +1 and "10" to +3. Herewith a transmissional rate of 1168 bits/s is converted to a symbol rate of 584 Ks/s. The tetravalent send signal SS on one side is conveyed to adaptive filter AF, and on the other side, to second digital converter DA in which the possible symbol values are converted into voltage values, for example, −3, −1, +1 and +3 volts. This now analog signal is then sent via send filter SF, which will still be further explained with reference to FIG. 5, to transmission unit GS, which connects the signal, ideally without changing the same, into transmission line L. On the received side, in an analog manner, the signal received via transmission line L is balanced out and assigned to the received path. The transmission unit GS has, as a result thereof, the function of a terminating unit in the manner usually utilized in terminal or hybrid units, which takes the signals, transmitted over transmission line L and, corresponding to the direction of transmission, separates or unites same.

Analogous to FIG. 2, which shows the differing signal variations in specially noted signal points PA, PB, PC and PD in FIG. 1, FIG. 4 illustrates the signal variations of the signal points characterized in FIG. 3 as signal point PA, PC and PD. As a result of the absence of a digital prefilter in the inventive transmission network TU (FIG. 3) now only the three signal points PA, PC and PD are of interest.

As is the case in FIG. 2a, in FIG. 4a, again a signal pulse whose height corresponds to one of the possible symbol values, is shown as representing send signal SS (FIG. 3). This pulse is transformed into digital/analog converter DA (FIG. 3) into an analog square pulse (FIG. 4b) and finally conveyed to send filter SF (FIG. 3), in which the required analog transmission pulse is formed (FIG. 4c). In send filter SF (FIG. 3) in addition to smoothing, pulse forming is also accomplished. Herein, in case the noted 2B1Q encoding is utilized, the square pulses in the height of −3, −1, +1 or +3, produced by the digital/analog converter DA are converted into an exactly desired pulse form. For this, the poles and zeros of transmission function of the send filter are determined in an appropriate process. Standard filters such as the Chebyshev or Butterworth filters are not suitable as the exit position of the send filter since the zeros of these filters are fixed in infinity. Nevertheless, the expense for an optimum send filter obtained via a systems identification process is practically identical with that of a standard filter utilized as a smoothing filter. This can also be recognized from the following transmission function T(s), which was optimized with reference to a symbol rate of 584 symbols/s and which, at the same time, satisfies the requirements set forth by ETSI:

$$T(s) = T_1(s) * T_2(s)$$

wherein $$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}$$

If, for the realization of the transmission function T(s) the SC (Switched Capacitor) technology is utilized, the circuit arrangement or connection method need not be changed upon changing of the symbol rate. The absence of programmability which this analog filter has with reference to a digital filter in no way limits the utility thereof in any way.

Figure 5:
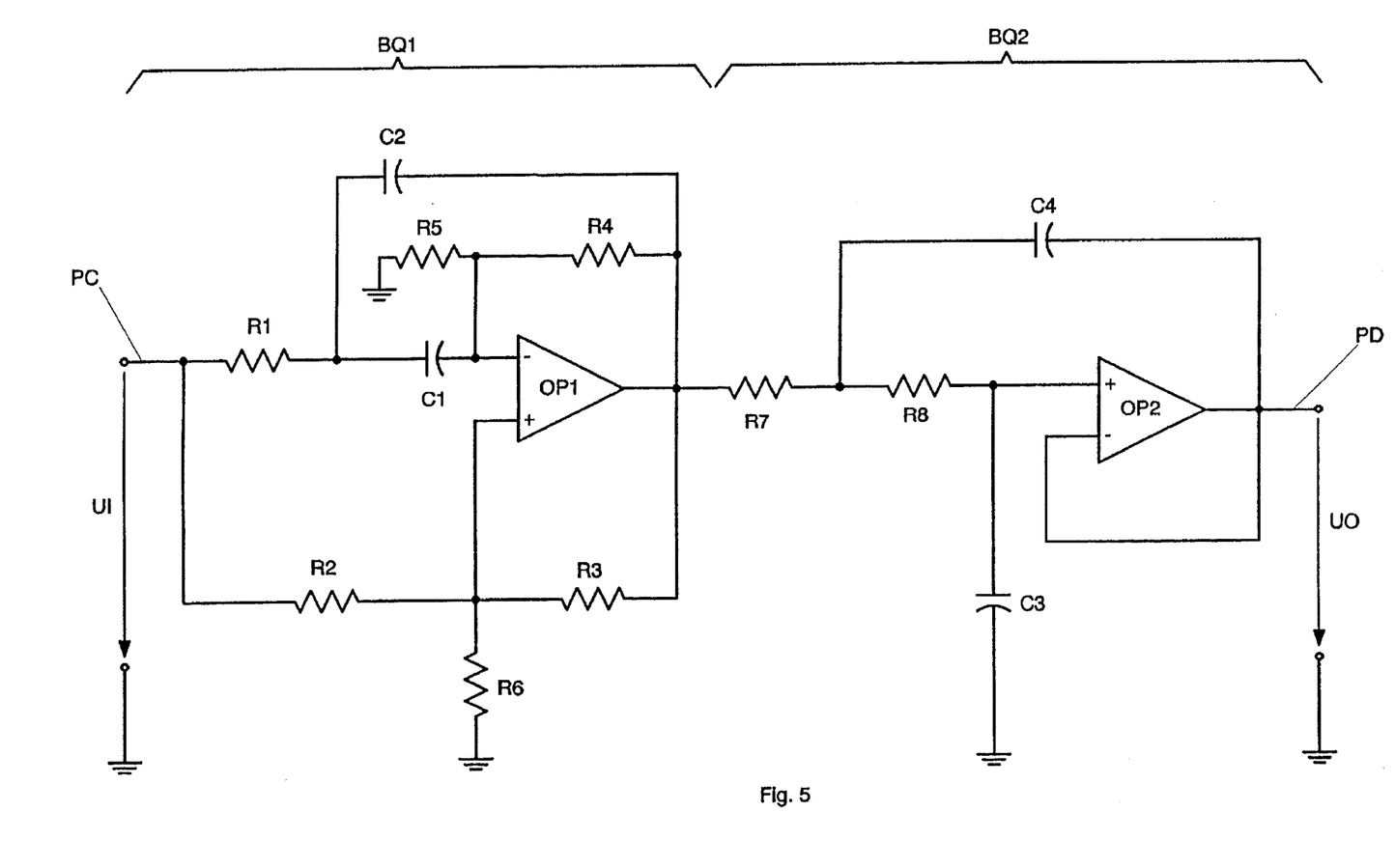
FIG. 5 shows a feasible implementation of the analog send filter.

In summary, it should be noted that in the inventive send filter, shown in FIG. 5, the smoothing as well as the pulse forming or shaping are accomplished. Therein it is quite sufficient if a digital/analog converter DA (FIG. 3) has a transformation rate which is not greater than the symbol rate of send signals SS (FIG. 3). If adaptive filter AF (FIG. 3) includes at least one FIR-filter portion, which covers the first part of the echo pulse answer and which is implemented after the storage or memory compensation method, a simple digital/analog converter DA (FIG. 3), with a two bit resolution is sufficient therefore, since its existing non-linearites, if applicable are compensated, in accordance with this invention with the aid of an FIR-filter portion in adaptive filter AF, which will still be explained in more detail hereinafter.

FIG. 5 shows a possible implementation form of the previously noted transmission function of send filter SF (FIG. 3) which is comprised of a cascade of a first and of a second filter block BQ1 and BQ2. While in first filter block BQ1 a partial transmission function $T_1(s)$, which does not include zeros in infinity, is implemented, in the second filter block BQ2 a partial transmission function $T_2(s)$ is realized or implemented which only has zeros in infinity. The sequence of the two filter blocks BQ1 and BQ2 can also be reversed.

First filter block BQ1 is comprised on its part of a first operational amplifier OP1, six resistors R1 to R6 and two condensers C1 and C2, wherein the input voltage U1 is a signal value proportional to the signal characteristics at signal point PC. Across therefrom, second filter block BQ2 includes a second operational amplifier OP2, two resistors R7 and R8 and two condensers C3 and C4, wherein the output signal of first operational amplifier OP1 is the input signal of second filter block BQ2 and wherein the output signal of the second operational amplifier OP2 corresponds to an outlet voltage UO, which in turn is proportional to the signal characteristic, at signal point PD and is, at the same time, the output signal of send filter SF.

As already noted, adaptive filter AF can take the form of FIR (Finite Impulse Response) filter, in which, corresponding to the provided member of coefficients, multiplications and additions can be carried out. The circuit expenditure of such FIR filters is however, rather substantial, so that the utilization of an IIR (Infinite Impulse Response) filter in combination with an FIR filter is proposed, (as for example in European Patent Publication EP-0 384 490). As per this known teaching, the circuit expenditure for adaptive filter AF can be reduced significantly. Such proposed cascading however, is problematic, particularly with reference to its adaption behavior. Much more useful are orthogonal filter structures such as adaptive filter AF shown in FIG. 6, which is comprised of an FIR filter portion and an IIR filter portion which is preferable implemented in a "Inverse Lattice" structure. Of importance therein is that not only the FIR filter connections $a_o$ to $a_{L-1}$, but also the IIR-filter conditions $x_o$ to $x_{n-1}$ are not correlated.

Figure 6:
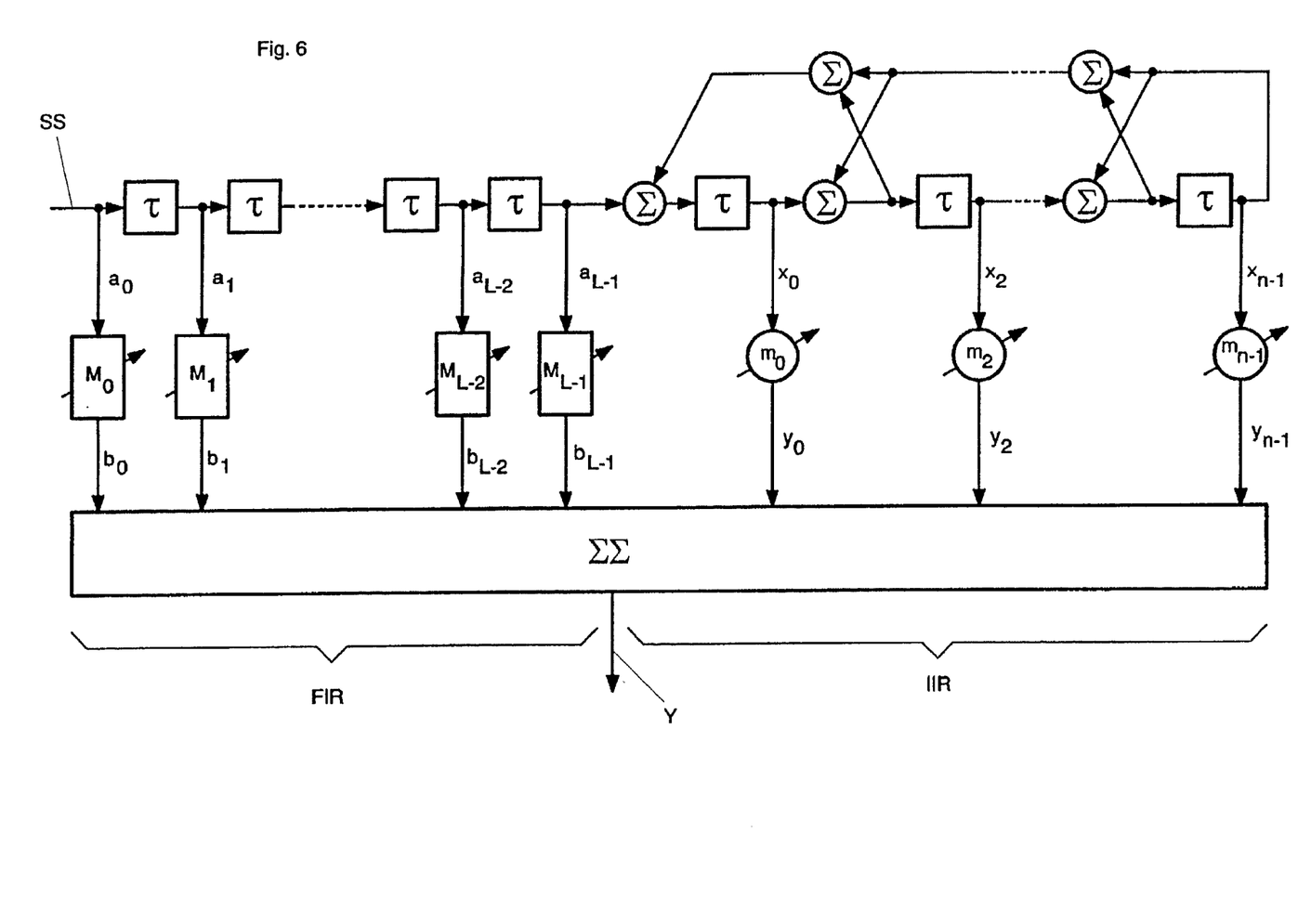
FIG. 6 shows an adaptive filter utilized in the echo canceler, comprised of an IIR and an FIR filter portion.

The FIR-filter portion is comprised of a series of switched digit delay elements τ, of storage elements $M_o$ to $M_{L-1}$, with four coefficient elements $b_o$ to $b_{L-1}$ respectively, and an adder ΣΣ. The input signal of adaptive filter AF as well as the FIR filter portion is send signal SS, which on one side, is transmitted to a first one of delay elements τ of a series of switched digit delay elements τ and, on the other side, transmitted to first storage element $M_o$. Further storage elements $M_1$ to $M_{L-1}$ are arranged in the same manner, wherein the input signals thereof, are removed between the subsequent digit delay elements and whose output signals are summed in adder ΣΣ. In this adder ΣΣ, the output signals of the IIR filter portion are also summed for the estimated echo signal Y. The poles of the IIR filter, for stability reasons, are not changed during operation. They are optimally adapted to the existing system surrounding with the process set forth by A. Kaelin et. al., in an article entitled "Linear Echo Cancellation Using Optimized Recursive Prefiltering", published in, Proc. IEEE Int. Symp. on Circuits and Systems, Chicago, pages 463 to 466, 1993. It is however, specifically noted that adaptive filter AF (FIG. 3) does not necessarily have to include an IIR filter portion.

The FIR-filter portion and its adaption is realized or implemented in accordance with the invention, in order to correct image distortions, that is nonlinearities of the digital/analog converter (FIGS. 1 and 3) that occur as a result of the nonlinear input/output response curve. In the process, both of the bits of the tetravalent conditions $a_o$ to $a_{L-1}$ are utilized as addresses for the respective storage element $M_o$ to $M_{L-1}$. The values of the addressed storage cells are accumulated in adder ΣΣ for the formation of the estimated echo signal Y. In addition, the values in storage elements $M_o$ to $M_{L-1}$ are adaptively formed in each storage element $M_o$ to $M_{L-1}$. Details regarding the adaption algorithms can be found in an article by N. Holte and S. Stueflotten "A new digital echo canceler for two-wire subscriber lines", published in IEEE Trans. on Communications, 29(11), pages 1573 to 1581, November 1981. In this manner, for an FIR filter with twenty taps, twenty storage elements $M_o$ to $M_{L-1}$, having four memory cells each, are required. The storage capacity thus for the 16 bit memory cells requires 20*4*16=1280 bits, or generally set forth as:

$$2^2 \cdot L \cdot W \text{ bits}$$

wherein L is the number of delay elements τ and W is the word width of the values stored in storage elements $M_o$ to $M_{L-1}$.

Figure 7:
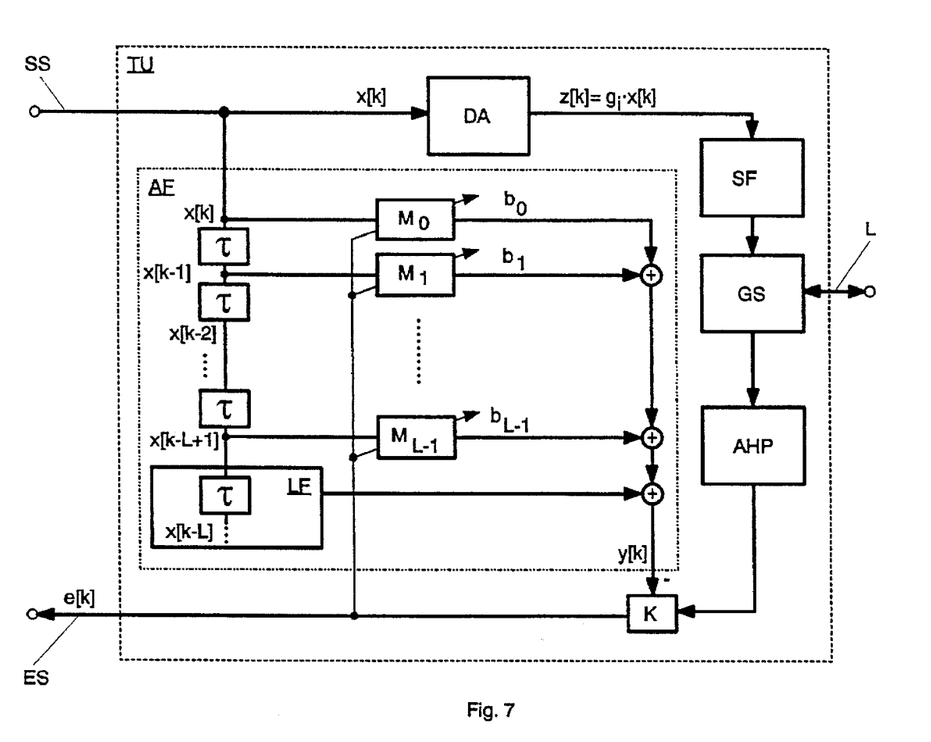
FIGS. 7 and 8 show further embodiments of the adaptive filters used in the echo canceler.

FIG. 7 again shows a transmission network TU for the compensation of static nonlinearities corresponding to FIG. 3, however with detail information regarding adaptive filter AF that is integrated into transmission network TU. The elements contained in the received path and required for the compensation are, for the sake of simplicity, combined in compensator K. In addition the digital values in FIG. 7 are shown as indices with square brackets. Thus, for example, the digital value of send signal SS at sampling point k is designated as x[k]. The signal value x[k] is therewith conveyed to the first digit delay element τ of adaptive filter AF as well as to digital/analog converter DA. Corresponding to adaptive filter AF illustrated in FIG. 6, additional (L−2) -digit delay elements τ are provided, which together with first digit delay element τ are switched in series. As a result thereof, at the outlets of digit delay element τ, signal values x[k−L+1] are produced, which are used together with signal value x[k] for addressing the storage locations contained in storage elements $M_o$ to $M_{L-1}$. In the process, starting at a word width of two bits for the signal values x[k], in each of storage elements $M_o$ to $M_{L-1}$, four storage locations are provided for each output value $b_o$ to $b_{L-1}$. The value of the addressed storage location is utilized as the output value $b_o$ to $b_{L-1}$, for the calculation of estimated echo signal Y (FIG. 3), that is y[k], in that the read outlet values $b_o$ to $b_{L-1}$ of storage elements $M_o$ to $M_{L-1}$ are accumulated. Mathematically the calculation of estimated outlet or output signal Y or y[k] can be described as follows:

$$y[k] = \sum_{i=0}^{L-1} b_i, \text{ wherein } b_i = f(x[k-i])$$

Outlet values $b_o$ to $b_{L-1}$, or the total values stored in storage elements $M_o$ to $M_{L-1}$, are as a result of the received signal ES or its value e[k] so adapted that the nonlinearities in digital/analog converter DA are compensated.

A linear filter portion LF, containing further digit delay elements τ, is switched after the digit delay elements τ that are switched in series in adaptive filter AF. In the process, for the structure of the linear filter portion LF and a FIR-filter or an IIR-filter or a combination of FIR- and IIR-filters is feasible. In the simplest embodiment of adaptive filter AF however, no linear filter portion LF is provided. In accordance with the selected filter structure the previously noted formula for the determination of the signal value y[k] must be augmented.

As noted, static nonlinearities occur when the digital/ analog converter DA shows no linear input/output response curve. It is assumed that the word width W of x[k] is two bits and that z[k] is the value of the analog outlet signal of digital/analog converter DA (FIG. 7), so that ideally z[k]= x[k] for all four of the possible inlet values x[k]. In case $$z[k]=g_i \cdot x[k] \text{ with } g_i \neq 1 \text{ for } i=0, 1, 2, 3$$

then according to the previously noted definition, this defines static nonlinearities.

Figure 8:
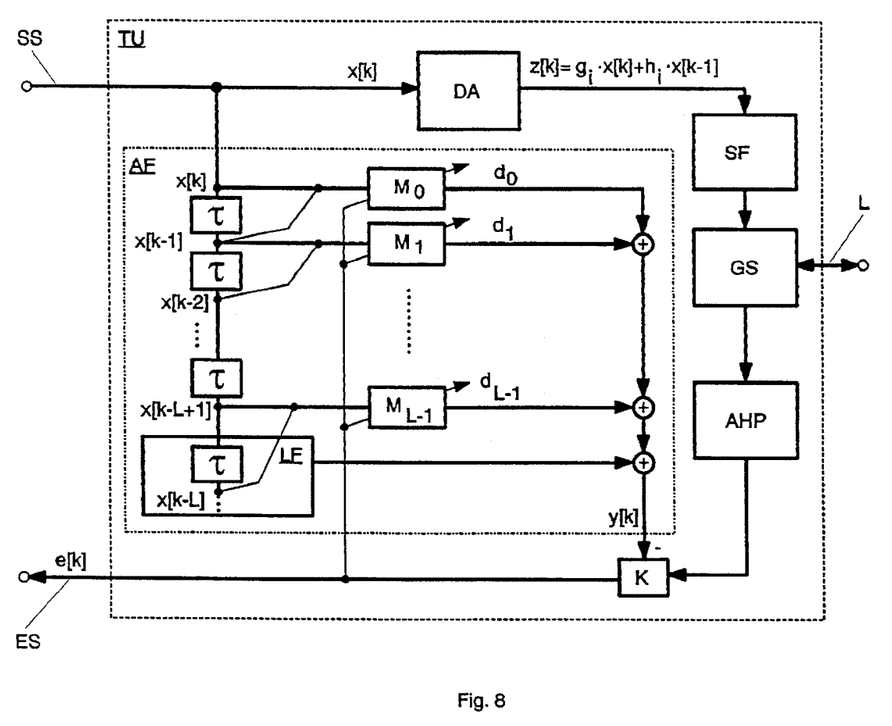

FIG. 8 illustrates a transmission network TU, with the aid of which, in addition to static, also dynamic nonlinearities of the digital/analog converter DA can be corrected. Dynamic nonlinearities occur when an outlet value z[k] of digital/ analog converter DA depends from input value x[k] and depends from at least one further previous input value x[k−1]. Mathematically this dependency can be expressed as follows:

$$z[k]=g_i \cdot x[k]+h_i \cdot x[k-1] \text{ with } g_i \neq 1 \text{ and } h_i \neq 0 \text{ for } i=0,1,2,3$$

In an analog manner, these dynamic non-linearities are compensated in the manner that during the calculation of an echo signal portion always one previous signal value, for addressing of one outlet value $d_o$ to $d_{L-1}$, is utilized. The estimated echo signal Y or y[k] is then determined as follows (FIG. 8):

$$y[k] = \sum_{j=0}^{L-1} d_j, \text{ wherein } d_j = w(x[k-j+1], x[k-j]) \text{ is.}$$

In the process, both of the bits of signal value x[k−j] and of signal value x[k−j+1] are utilized as address lines for storage element $M_j$. In the above-noted formula, the portion of a possibly present linear filter portion LF is not considered. The total storage requirement thus, in the present case amounts to $$2^4 \cdot L \cdot W \text{ bits,}$$

wherein L again corresponds to the number of digit delay elements τ and W corresponds to the word width of the values stored in storage elements $M_o$ to $M_{L-1}$.

In case nonlinearities having a memory greater than 1 are to be compensated, that is in case more than one previous input signal value x[k−i] (wherein i>1) influences the next output value y[k], the storage compensation process can be utilized in an analog manner. Instead of the inclusion of the instantaneous and of a previous input signal value x[j] and x[j−1] for the calculation of the j-st echo signal portion, further input signal values x[j−2], x[j−3], etc. are also considered therewith. In this manner even complex nonlinearities of the digital/analog converter DA can be compensated. The storage requirement however increases correspondingly: If the number of considered input signal values is S then the required storage size for all storage elements $M_o$ to $M_{L-1}$, in total, can be calculated via:

$$2^{2(S+1)} \cdot L \cdot W \text{ bits,}$$

In a further embodiment of this invention there is provided that during each echo signal portion calculation a differing number of input signals x[j] are used for the compensation on nonlinearities. For example, in a adaptive filter AF with 32 digit delay elements τ, the first 16 digit delay elements are used for compensating dynamic nonlinearities, with a memory of 1, i.e., the calculation of the estimated echo signal value is made under the consideration of the instantaneous and the previous input signals, while the second 16 digit delay elements τ are used solely for the compensation of static nonlinearities. In principle, any desired subdivisions or combinations may be utilized.

It should be expressly understood, that in adaptive filter AF only one storage device is provided and that the input signals x[k] to x[k−L+1], that form the address range or region, can be assigned to this storage device as desired. It is also quite feasible to utilize but one storage device with only one address range or region, which is formed of the total bits of input signals x[k] to x[k−L+1]. In this case, however, the storage requirement becomes unrealistically large, for example, $4^{20} \cdot 16 = 1.76 \cdot 10^{13}$ bits for FIR filter with twenty taps (L=20).

Finally, it should be specifically noted that the circuit arrangement of this invention can be successfully utilized not only for HDSL data transfer. Rather, the circuit arrangement is also usable for other transmission types for the compensation of echo signal portions.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A circuit arrangement comprised of:

a send path carrying a send signal;

a receiving path carrying a received signal;

an adaptive filter;

a compensator in the received path;

a digital/analog converter;

a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter, wherein the estimated digital echo signal is transmitted to the compensator for the reduction of the echo signal portion in the received path, with the send signal being impressed upon the digital/analog converter and a send filter being interposed in the send path, between the digital/analog converter and the transmission unit, wherein the adaptive filter is comprised of at least an FIR (Finite Impulse Response) filter portion, with the FIR filter portion being of the storage compensation type, wherein the adaptive filter is additionally comprised of an IIR (Infinite Impulse Response) filter portion, and wherein the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

2. The circuit arrangement of claim 1 wherein the conversion rate of the digital/analog converter is no greater than the symbol rate of the send signal.

3. A circuit arrangement comprised of:

a send path carrying a send signal;

a receiving path carrying a received signal;

an adaptive filter;

a compensator in the received path;

a digital/analog converter;

a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter, wherein the estimated digital echo signal is transmitted to the compensator for the reduction of the echo signal portion in the received path, with the send signal being impressed upon the digital/analog converter and a send filter being interposed in the send path, between the digital/analog converter and the transmission unit, wherein the adaptive filter is comprised of at least an FIR (Finite Impulse Response) filter portion, with the FIR filter portion being of the storage compensation type, wherein in the FIR filter portion (FIR) at least one storage element and at least one digit delay element are provided, and when several digit delay elements are provided the several digit delay elements are switched in series with the first digit delay element being impressed with the send signal, wherein the send signal and the send signals delayed via the digit delay elements, are each impressed on at least one storage element, from each of which one value of one addressed storage cell in the storage element is read and accumulated in an adder, and wherein the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

4. A circuit arrangement comprised of:

a send path carrying a send signal;

a receiving path carrying a received signal;

an adaptive filter;

a compensator in the received path;

a digital/analog converter;

a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter, wherein the estimated digital echo signal is transmitted to the compensator for the reduction of the echo signal portion in the received path, with the send signal being impressed upon the digital/analog converter and a send filter being interposed in the send path, between the digital/analog converter and the transmission unit, wherein the adaptive filter is comprised of at least an FIR (Finite Impulse Response) filter portion, with the FIR filter portion being of the storage compensation type, wherein in the FIR filter portion (FIR) at least one storage element and at least one digit delay element are provided, and when several digit delay elements are provided the several digit delay elements are switched in series with the first digit delay element being impressed with the send signal, wherein the send signal is tetravalent and the digital/analog converter has a resolution of two bits, whereby the FIR filter portion is so adaptively adjusted that non-idealities of the digital/analog converter are corrected, and wherein the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

5. A circuit arrangement comprised of:

a send path carrying a send signal;

a receiving path carrying a received signal;

an adaptive filter;

a compensator in the received path;

a digital/analog converter;

a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter, wherein the estimated digital echo signal is transmitted to the compensator for the reduction of the echo signal portion in the received path, with the send signal being impressed upon the digital/analog converter and a send filter being interposed in the send path, between the digital/analog converter and the transmission unit, wherein the adaptive filter is comprised of at least an FIR (Finite Impulse Response) filter portion, with the FIR filter portion being of the storage compensation type, wherein in the FIR filter portion (FIR) at least one storage element and at least one digit delay element are provided, and when several digit delay elements are provided the several digit delay elements are switched in series with the first digit delay element being impressed with the send signal, wherein the send signal is tetravalent and the digital/analog converter has a resolution of two bits, whereby the FIR filter portion is so adaptively adjusted that non-idealities of the digital/analog converter are corrected, wherein the send signal is 2B1Q encoded, and wherein the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

6. A circuit arrangement comprised of:

a send path carrying a send signal;

a receiving path carrying a received signal;

an adaptive filter;

a compensator in the received path;

a digital/analog converter;

a transmission unit; and a transmission line attached to the transmission unit, wherein over the transmission line at least the send signal, the received signal and echo signal portions are transmitted, with the send path and the received path being connected with the transmission unit; with the send signal, for the estimation of the echo signal, being transmitted to the adaptive filter, wherein the estimated digital echo signal is transmitted to the compensator for the reduction of the echo signal portion in the received path, with the send signal being impressed upon the digital/analog converter and a send filter being interposed in the send path, between the digital/analog converter and the transmission unit, wherein the adaptive filter is comprised of at least an FIR (Finite Impulse Response) filter portion, with the FIR filter portion being of the storage compensation type, wherein in the FIR filter portion (FIR) at least one storage element and at least one digit delay element are provided, and when several digit delay elements are provided the several digit delay elements are switched in series with the first digit delay element being impressed with the send signal, wherein the adaptive filter is additionally comprised of an IIR (Infinite Impulse Response) filter portion, and wherein the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

* * * * *